(12) United States Patent
Okamoto et al.

(10) Patent No.: US 7,813,620 B2
(45) Date of Patent: Oct. 12, 2010

(54) RECORDING APPARATUS, EDITING APPARATUS, DIGITAL VIDEO RECORDING SYSTEM, AND FILE FORMAT

(75) Inventors: Keishi Okamoto, Osaka (JP); Hideaki Mita, Hyogo (JP); Hideki Ohtaka, Osaka (JP)

(73) Assignee: Panasonic Corporation, Osaka (JP)

( * ) Notice: Subject to any disclaimer, the term of this patent is extended or adjusted under 35 U.S.C. 154(b) by 964 days.

(21) Appl. No.: 10/591,264

(22) PCT Filed: Oct. 13, 2005

(86) PCT No.: PCT/JP2005/019248

§ 371 (c)(1),
(2), (4) Date: Aug. 31, 2006

(87) PCT Pub. No.: WO2006/041202

PCT Pub. Date: Apr. 20, 2006

(65) Prior Publication Data

US 2008/0273862 A1    Nov. 6, 2008

(30) Foreign Application Priority Data

Oct. 14, 2004 (JP) ............................. 2004-299977

(51) Int. Cl.
*H04N 5/91* (2006.01)
(52) U.S. Cl. .................................... 386/95; 386/125
(58) Field of Classification Search .................. 386/46, 386/95, 111, 112, 125, 126; 345/428
See application file for complete search history.

(56) References Cited

U.S. PATENT DOCUMENTS

| | | | |
|---|---|---|---|
| 5,852,435 A | 12/1998 | Vigneaux et al. | |
| 6,211,869 B1 | 4/2001 | Loveman et al. | |
| 6,292,805 B1 * | 9/2001 | Basso et al. | 707/104.1 |
| 7,113,693 B1 * | 9/2006 | Chatani et al. | 386/94 |
| 7,386,219 B2 * | 6/2008 | Ishige | 386/55 |

(Continued)

FOREIGN PATENT DOCUMENTS

EP    1 187 475    3/2002

(Continued)

OTHER PUBLICATIONS

S. Hofmann, "Bandlose and IT-basierende Systeme in der TV-Produktion, Wegbereitende Techniken", FKT Fernseh Und Kinotechnik, Fachverlag Schiele & Schon GmbH, Berlin, DE, vol. 57, No. 8/9, Aug. 2003, pp. 396-398, 400, XP001220628.

(Continued)

*Primary Examiner*—Huy T Nguyen
(74) *Attorney, Agent, or Firm*—Wenderoth, Lind & Ponack, L.L.P.

(57) ABSTRACT

Provided is a digital video recording system which can properly maintain a corresponding relationship between recorded data in two different kinds of formats which are generated from the same inputted video-audio data, even if those data are managed separately. In a case where the first file is generated as a main material file with a high resolution, and the second file is generated as a low-bitrate audio-video (AV) data file (204) with a low resolution, a CLIP-UMID (309) which is identification information unique to the first file is stored in a skip box (304) in the low-bitrate AV data file (204).

7 Claims, 6 Drawing Sheets

U.S. PATENT DOCUMENTS

| | | |
|---|---|---|
| 2002/0118949 A1 | 8/2002 | Jones et al. |
| 2003/0088877 A1 | 5/2003 | Loveman et al. |
| 2004/0103233 A1 | 5/2004 | Shinkai et al. |

FOREIGN PATENT DOCUMENTS

| | | |
|---|---|---|
| JP | 11-507184 | 6/1999 |
| JP | 2001-502461 | 2/2001 |
| JP | 2004-187275 | 7/2004 |
| JP | 2004-531119 | 10/2004 |
| WO | 96/27263 | 9/1996 |

OTHER PUBLICATIONS

J. H. Wilkinson et al., "Tools and Techniques for Globally Unique Content Identification," SMPTE Journal, SMPTE Inc., Scarsdale, NY, US, vol. 109, No. 10, Oct. 2000, pp. 795-799, XP000969315.

* cited by examiner

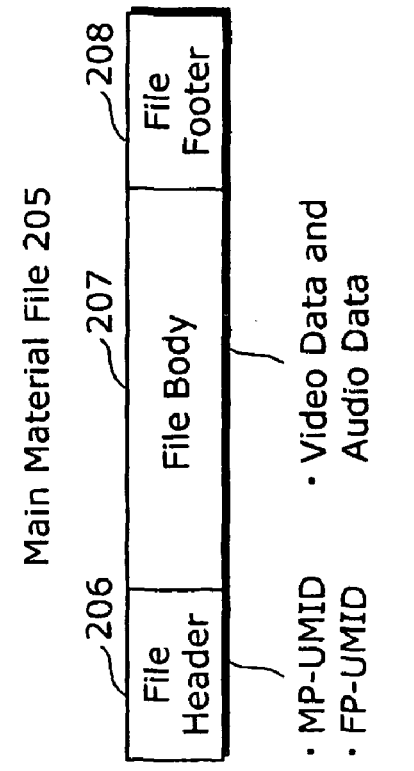
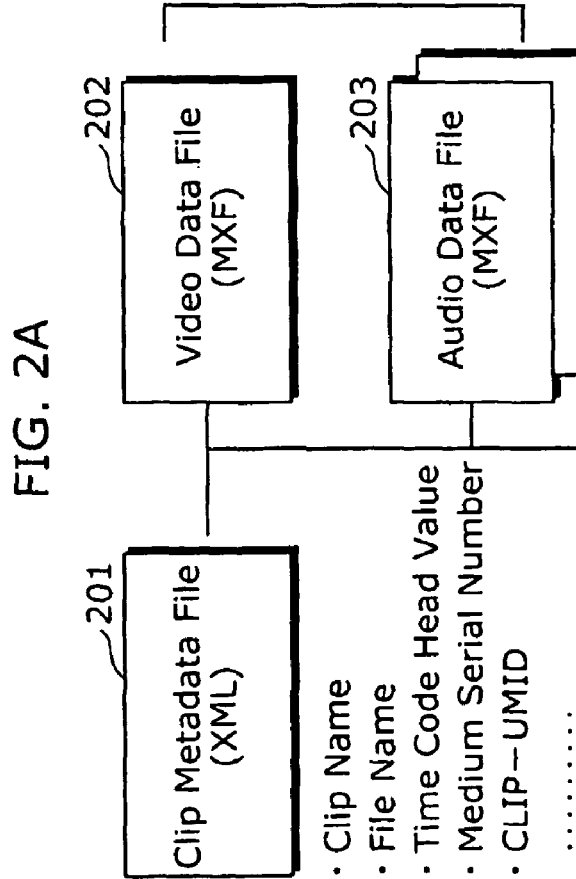

RECORDING APPARATUS, EDITING APPARATUS, DIGITAL VIDEO RECORDING SYSTEM, AND FILE FORMAT

TECHNICAL FIELD

The present invention relates to a recording apparatus, an editing apparatus, a digital video recording system, and a file format, for recording and editing video and audio data of a program material.

BACKGROUND ART

In a conventional video recording system, a non-linear editing system using a personal computer (PC) is more effective in speedy random accessibility or editing convenience, as compared with a linear editing system using a video tape recorder (VTR). Especially, with a recent progress on high performance and low price of the PC, the non-linear editing system has been generally used. However, the non-linear non liner editing system for handling a high-bitrate material such as a high definition (HD) television program is expensive, and in a case of a standard definition (SD) television program, it is not enough to perform editing work using a laptop outside of an editing room, for example, at a recording site, due to a processing speed and a capacity in a recording medium, such as a hard disk, for storing the material.

One method for solving the above problems is disclosed in Japanese Translation of PCT International Application JP11-507184 publication which provides a digital video recording system for recording the same program source material into the first format and the second format which are stored in the first recording medium and the second recording medium, respectively, together with respective time code information regarding the other format. The first format is encoded with a higher compression ratio compared to the second format. The material recorded in the first format is edited off-line to generate editing information, and the material recorded in the second format is used to generate a final version of the program based on the editing information. Thereby it is possible to realize an editing system at a low price.

However, in the digital video recording system disclosed in the above patent publication, the "time code information" is used to relate the recorded data in two kinds of formats to each other, which are a high-resolution format and a low-resolution format, so that, there is no problem in managing those recorded data in two kinds of formats together, but when those data are sent or stored separately, this causes a problem that a relationship between those recorded data in both formats cannot be recognized, since this may cause existence of a plurality of files having the same time code, resulting in difficulty in maintaining the relationship between the high-resolution data file and the low-resolution data file. Moreover, there is a case where the time code information would be rewritten to be edited when a user edits the two kinds of data, and such a case also causes a problem that the relationship between those recorded data in both formats cannot be recognized.

Moreover, in the conventional digital video recording system, a "file name" is, for example, automatically assigned to a file in a recording apparatus, and used to relate recorded data in two kinds of formats to each other, which are a high-resolution format and a low-resolution format. This case may cause a problem that the automatically assigned file name is changed by the user's input during user's editing work, and eventually it is impossible to relate those recorded data in two kinds of formats with each other.

In order to solve the above problems, the present invention provides a digital video recording system which can always maintain the corresponding relationship between the recorded data in two kinds of formats having different degrees of the resolution, without being later affected by user's operations, even if those recorded data are managed separately.

DISCLOSURE OF INVENTION

In order to solve the above conventional problems, a recording apparatus according to the present invention which records a first data with a high resolution and a second data with a resolution lower than the resolution of the first data as separate files, the first data and the second data being generated from a same video and audio source, the recording apparatus includes: an input unit operable to receive the video and audio source from outside; a first coding unit operable to code the video and audio source inputted from the input unit in order to generate the first data; a second coding unit operable to code the video and audio source inputted from the input unit in order to generate the second data, the second data being coded with a resolution lower than a resolution of the first data; and a recording unit operable to record at least the data coded by the first coding unit onto a recording medium, wherein the second data includes identification information unique to the first data.

Furthermore, a file format of the second data is a MPEG-4 format, and the identification information is an Unique Material Identifier and stored in a skip box in the MPEG-4 format.

With the above structure, the recording apparatus can record at least the UMID which is identification information unique to the file of the first data onto the file of the second data.

Still further, an editing apparatus which edits a first data with a high resolution and a second data with a resolution lower than the resolution of the first data that are recorded as separate files, the first data and the second data being generated from a same video and audio source, the editing apparatus includes a search unit operable to search for the first data corresponding to the second data by using identification information unique to the file of the first data which is included in the second data, when the first data corresponding to the file of the second data is searched.

Still further, a file format of the second data is a MPEG-4 format, and the identification information is an Unique Material Identifier and stored in a skip box in the MPEG-4 format.

With the above structure, in the editing apparatus, the search unit can correctly search for the second data corresponding to the first data by using the UMID which is the identification information, so that it is possible to improve efficiency of editing work.

Note that, in order to achieve the above objects, the present invention can be realized for a digital video recording system which includes characteristic units in the recording apparatus and the editing apparatus, and for a file format which is recorded by the recording apparatus and edited by the editing apparatus.

The digital video recording system according to the present invention can maintain a corresponding relationship between recorded data in two kinds of formats, even if those recorded data are managed separately, and can shorten a required time period from recording a material as the two kinds of recorded data to broadcasting the material.

FURTHER INFORMATION ABOUT TECHNICAL BACKGROUND TO THIS APPLICATION

The disclosure of Japanese Patent Application No. 2004-299977 filed on Oct. 14, 2004 including specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIGS. 2A and 2B are diagrams showing a structure of a clip according to the embodiment of the present invention;

BEST MODE FOR CARRYING OUT THE INVENTION

The following describes an embodiment according to the present invention with reference to the drawings.

Figure 1:
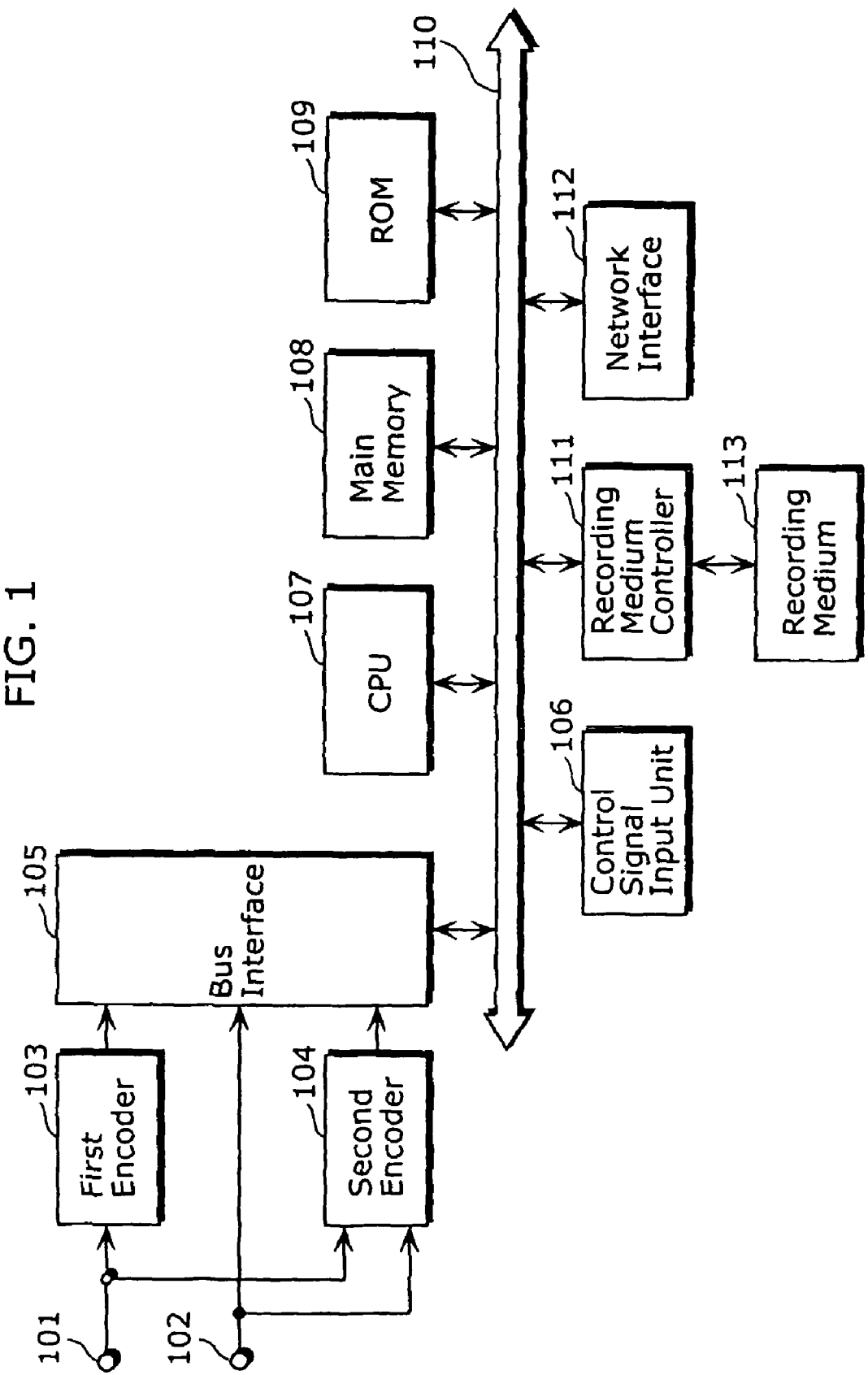
FIG. 1 is a functional block diagram showing a recording apparatus included in a digital video recording system according to an embodiment of the present invention.

FIG. 1 is a functional block diagram showing a recording apparatus included in a digital video recording system according to the embodiment of the present invention. Referring to FIG. 1, the recording apparatus includes: a video signal input terminal 101 as a means for receiving video data; an audio-signal input terminal 102 as a means for receiving audio data; a first encoder 103 as the first coding means; a second encoder 104 as the second coding means; a bus interface 105; a control signal input unit 106; a central processing unit (CPU) 107; a main memory 108; a ROM 109; a bus 110; and a recording medium controller 111 as a recording means. Note that the recording apparatus further includes a network interface 112 to be connected with a network through which a below-described low-bitrate audio-video (AV) data file is transmitted.

A recording medium 113 is a semiconductor memory card and records a main material file with a high resolution and the like by using the recording medium controller 111. Note that a serial number unique to the recording medium 113 has been written into a non-volatile memory in the medium during manufacture, and is able to be read out according to a command from a host.

FIG. 2 shows one example of files included in a clip generated by the system according to the present invention. One clip includes: a clip metadata file 201 which indicates information regarding the files included in the clip, and the like; main material files 205 which are a video data file 202 and an audio data file 203; and a low-bitrate AV data file 204 which is encoded with a bitrate lower than a bitrate of the main material files 205. Regarding formats of these files, the clip metadata file 201 is written in the Extensible Markup Language (XML), the main material files 205 are Material exchange Formats (MXFs), and the low-bitrate AV data file 204 is a MP4 (MPEG-4) format.

Firstly, the main material files 205 are described in more detail. The main materials 205 of video and audio data are the MXF formats which are compliant with the SMPTE-377M standard. As shown in FIG. 2B, each main material 205 includes a file header 206, a file body 207, a file footer 208, which are sequentially arranged from a head of the main material file 205. The file header 206 stores metadata, such as a file structure parameter and a video or audio parameter, which are necessary to reproduce the MXF file. The file body 207 stores the video data and the audio data. The file footer 208 stores data indicating the end of the file. The file header 206 stores further metadata regarding the main material file 205. The further metadata includes: a material package which is information defining how to reproduce the video data or the audio data on an output timeline; and a file package which is information for identifying the clip to be outputted on the timeline, both of which are assigned with respective identifiers called unique material identifiers (UMIDs). More specifically, as the UMIDs, a material package UMID (MP-UMID) is assigned to the material package, and a file package UMID (FP-UMID) is assigned to the file package.

Regarding the files as the main material files 205, the video data is stored in one file per a clip, while the audio data is stored in separate files for respective channels, for example, two files when two channels are recorded. These files are generated from the same material, so that each MP-UMID is identical, but each FP-UMID is, not like the MP-UMID, different from one another, and has a different value depending on whether the file stores the video data or the audio data, and depending on which channel the file stores for the audio data.

A UMID is an identifier assigned to a generated material in order to global-uniquely identify an arbitrary audio-video material. The structure and creating method of the UMID are defined by the SMTPE-330M standard. The UMID mainly includes: a basic UMID (32 bytes) having a material number unique to each material; and an extended UMID (64 bytes) having, as extended information, attribute information (date, place, user name, for example) regarding the material.

Note that the UMID creating rule is standardized not to create a plurality of identical UMIDs. In the embodiment of the present invention, the UMID is used to efficiently manage a material, even if a user sends or receives a file of the material to or from another user. If the user later manages the material and changes a name or a time code of the file, this does not cause any problems for managing the material, but if the user later rewrites the UMID without authority, this results in failing to manage the material itself, which is a more serious and fundamental problem than failing to maintain a corresponding relationship between the main material files 205 and the low-bitrate AV data file 204. The present invention can be implemented only under circumstances where the managed file is assigned with a not-overlapped correct UMID.

Next, the clip metadata file 201 is described in more detail. The clip metadata file 201 stores: a clip name; a file name of each file including in the clip; a time code value of a video frame at a head of the clip; a length (time period) of the clip; information regarding a frame rate of the video data, a sampling rate of the audio data, and the like; a serial number of a recording medium in which the clip is recorded; and the like. The clip metadata file 201 further stores a clip UMID (CLIP-UMID) as an ID for identifying the material (clip). Note that, this CLIP-UMID and the MP-UMIDs in the video and audio data files are set to as the same UMID, since these UMIDS are IDs of the same clip.

Next, the low-bitrate AV data file 204 is described in more detail.

Figure 3:
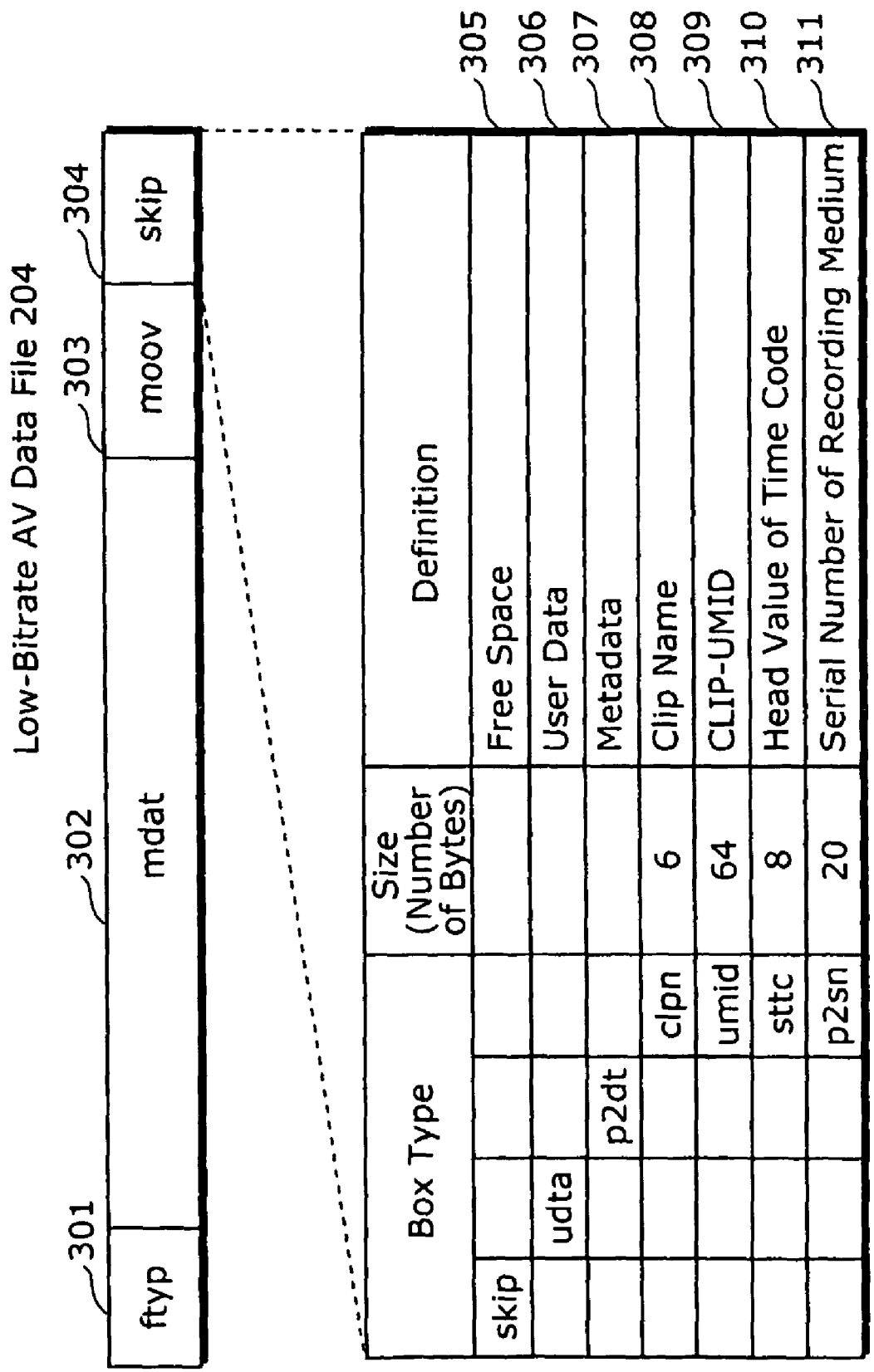
FIG. 3 is a diagram showing a structure of a low-bitrate audio-video (AV) data file according to the embodiment of the present invention.

FIG. 3 is a diagram showing one example of a structure of a MP4 file which is a format of the low-bitrate AV data file 204 according to the embodiment of the present invention. The MP4 file format is compliant with ISO/IEC 14496-1/AMD6 standard. All information is stored in a structure called a box. The information includes: a multiplexed video and audio bitstream (media data); and a management information (metadata) regarding the media data. Each box is assigned with an identifier of four characters to represent a box type.

A file type box (ftyp) 301 positioned at a head of the file is a box for identifying the file. A media data box (mdat) 302 stores the multiplexed bitstream of video and audio data. A movie box (moov) 303 stores the management information for reproducing the bitstream stored in the media data box. A skip box (skip) 304 stores data whose readout is skipped during reproduction of the file.

In the embodiment, as shown in FIG. 3, the skip box 304 stores: a clip name 308 regarding the clip which includes the low-bitrate AV data file 204; a CLIP-UMID 309 which is the clip UMID assigned to the main material; a time code value 310 regarding a head frame in the clip; a serial number 311 of the recording medium in which the main material is recorded. Note that the skip box 304 in FIG. 3 further includes a free space 305, a user data 306, a metadata 307, but the skip box 304 may include at least one of the UMID 309, the time code value 310, and the serial number 311.

Next, operations performed by the recording apparatus shown in FIG. 1 is described.

In the embodiment, referring again to FIG. 1, the video signal input terminal 101 receives a 4:2:2 component digital video signal. At the same time, the audio signal input terminal 102 receives digital audio signals from two channels, which are quantized at a sampling frequency of 48 kHz and 16 bits. The video signal received by the video signal input terminal 101 is inputted, as a signal obtained from the same source, into both the first encoder 103 and the second encoder 104, to be coded by the respective encoders. In other words, the first encoder 103 and the second encoder 104 are inputted with the same video source at the same time, and then code the source separately. On the other hand, the audio signals received by the audio signal input terminal 102 are inputted only to the second encoder 104 to be coded.

The first encoder 103 encodes the inputted video signal by a DVCPRO method. Note that, in the embodiment, the inputted audio signals are not coded by the first encoder 103, but the audio signals may be coded by the first encoder 103 as formats, such as MPEG formats, as far as the first encoder 103 codes the audio signals with a bitrate higher than a bitrate used in the second encoder 104 as described further below. The bitrate for the video data file is about 25 Mbps, while the bitrate for the audio data file is about 1.5 Mbps for two channels.

The second encoder 104 codes the video data by the MPEG-4 method and the audio data by the MPEG-2/AAC method in order to code those data with respective predetermined bitrates, and then multiplexes those coded data to generate data to be stored in the boxes in the MP4 format file, except the skip box.

The control signal input unit 106 inputs commands, such as recording ON/OFF, a time code, material data attribute information to be set in the UMID, and the like. The CPU 107 executes a processing program stored in the ROM 109 and the main memory 108 (or one of them) based on the inputs by the control signal input unit 106.

The DVCPRO format video data which is outputted from the first encoder 103, the MP4 file (except a skip box) data which is outputted from the second encoder 104, and non-compressed audio data which is inputted from the audio signal input terminal 102 are temporarily stored into a buffer via the bus interface 105, and then transmitted into the main memory 108 according to instructions from the CPU 107.

Among these various data necessary to generate each file (except encoded data), a serial number of the recording medium 113 has been read out prior to the recording processing, and has been stored in the main memory. The UMID, the clip name, the time code, and the like are set by the control signal input unit 106, or generated by the CPU 107 when the recording starts.

In the main memory 108, the video data and the audio data as the main material are added with respective predetermined headers and footers, such as UMIDs, in order to generate respective MXF format files. A low-bitrate AV data file is generated by adding data to be stored in the skip box at the end of a file outputted from the second encoder 104. Furthermore, a clip metadata file is generated and written into the recording medium 113.

Figure 4:
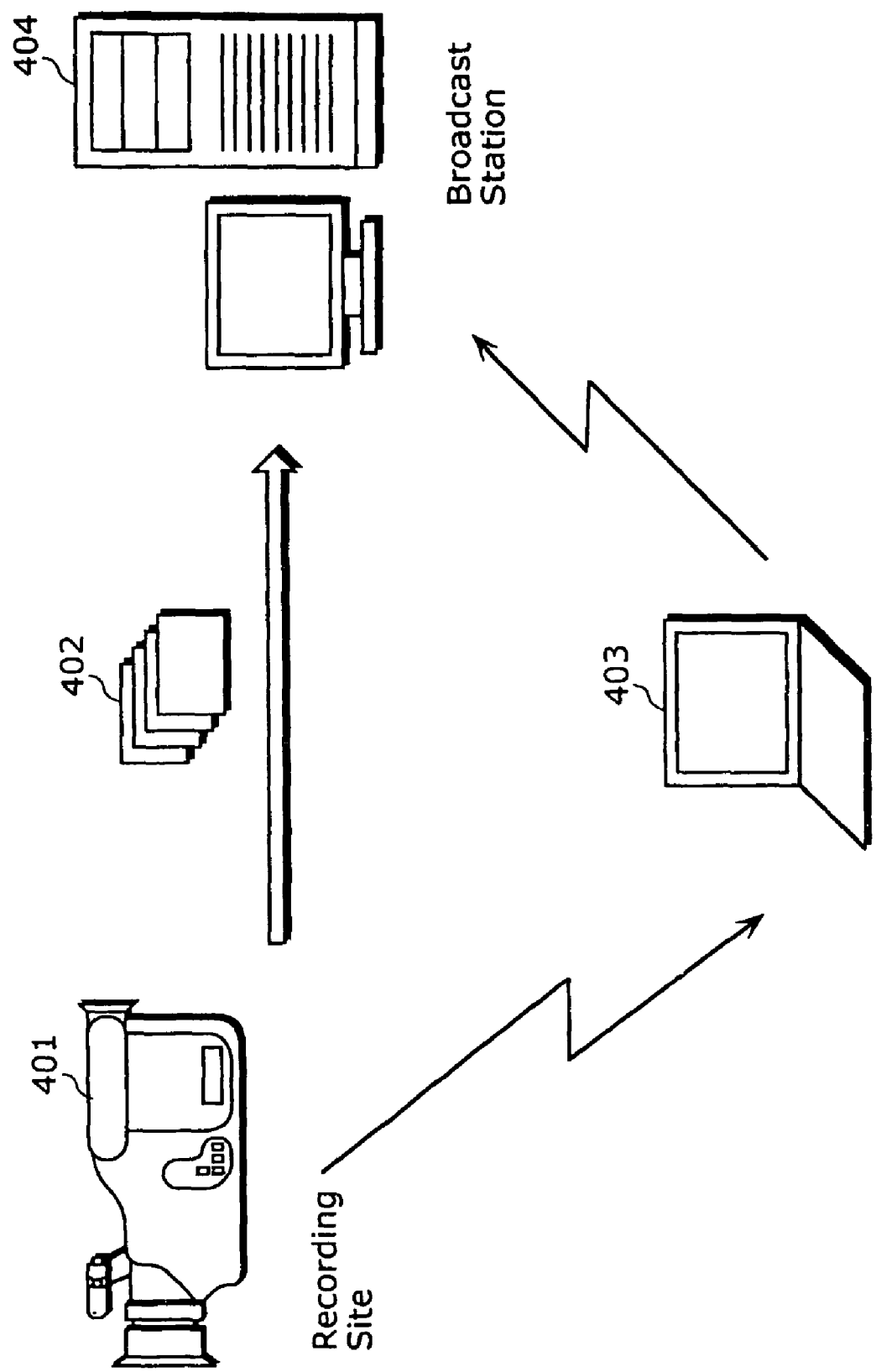
FIG. 4 is a diagram showing a structure of an editing system according to the embodiment of the present invention.

FIG. 4 is a diagram showing a structure of an editing system using the digital video recording system according to the present invention. At a recording site, a material is recorded as a clip onto a recording medium 402 by using a camera recorder 401 as the digital video recording system. From the recorded clip, a clip metadata file and a low-bitrate AV data file, but not main material files, are transmitted to a personal computer (PC) 403. On the other hand, the recording medium 402 in which the main material files are recorded is transported to a broadcast station. The transmission of the clip metadata file and the low-bitrate AV data file is performed via a network, for example, via the network interface 112 shown in the structure of FIG. 1. Sizes of the clip metadata file and the low-bitrate AV data file are small enough to be transmitted in a short time period, so that a location of the PC 403 may be at the recording site, the broadcast station, or other places.

The PC 403 creates an edit list by adding data, such as comments, to the clip metadata file, or by cutting work, during reproducing and confirming the low-bitrates AV data file by using a general-purpose viewer for reproducing the MP4 file. A time code of the cutting in the edit list is calculated according to the time code value at a head of the clip. Note that the special data, such as the UMID of the main material file or the serial number of the recording medium, are stored in the skip box, so that the special data do not affect the reproduction by the general-purpose viewer. The overwritten clip metadata file and the created edit list are transmitted to the broadcast station via the network.

An editing apparatus 404 at the broadcast station writes all main material files recorded on the recording medium 402 into a hard disk drive (HDD), and stores those files into a database. Next, the edit list, the clip metadata file, and the low-bitrate AV data file which are sent separately, are stored in the database. Here, by using the CLIP-UMID recorded in the clip metadata file, a search is performed from the stored main material files to find files having the same CLIP-UMID, and then relates the found files with the low-bitrate AV data file. By using the CLIP-UMID, it is possible to automatically relate those files without manual confirmation. After the relationships are registered in the database, the main material files are read out according to the edit list, so that it is possible to reproduce a content which is edited from the high-bitrate main material data.

Figure 5:
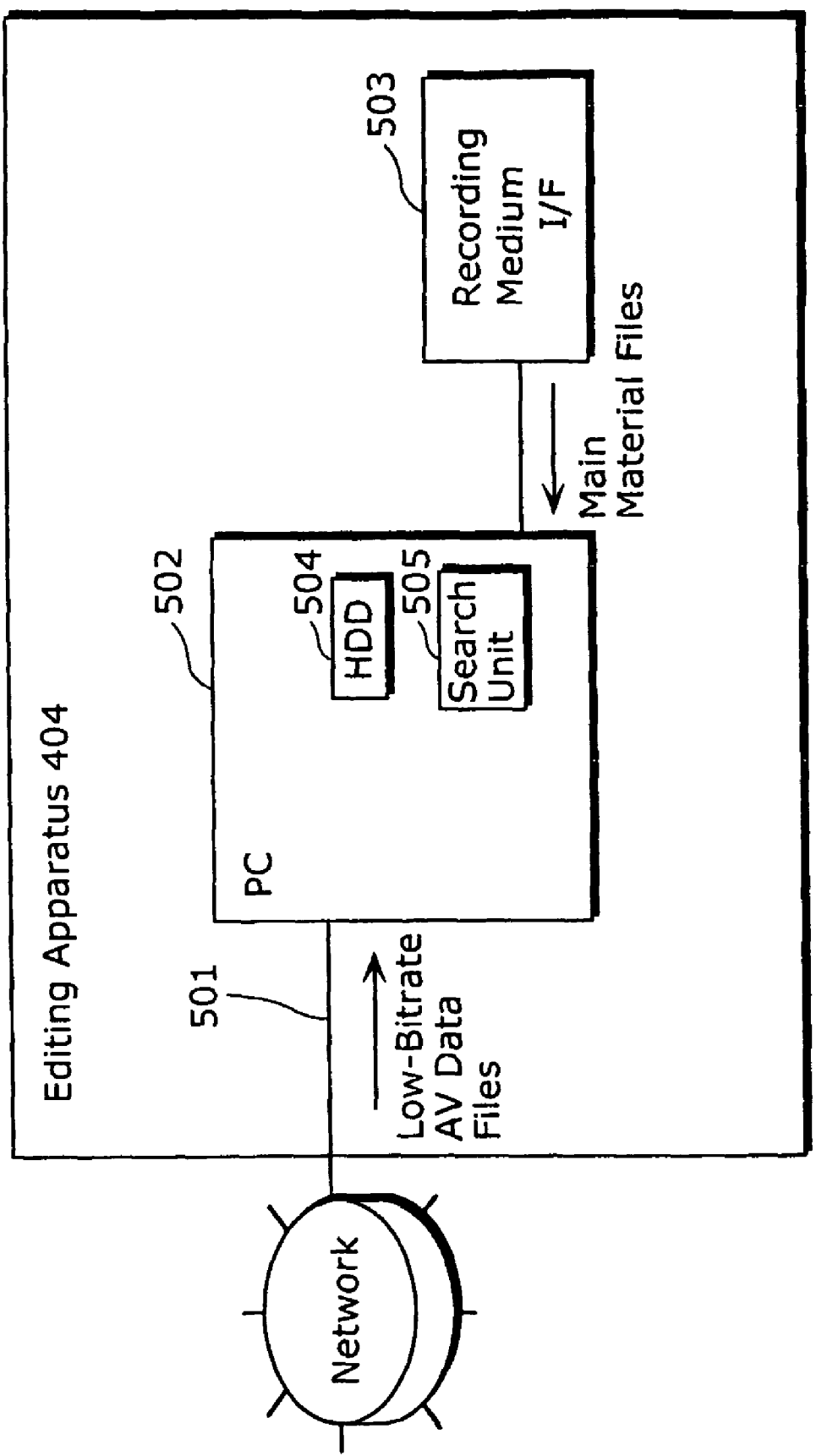
FIG. 5 is a diagram showing a structure of an editing apparatus at a broadcast station according to the embodiment of the present invention.

FIG. 5 is a diagram showing a structure of the editing apparatus 404 at the broadcast station.

The editing apparatus 404 connected to a network interface 501 includes a PC body 502, and a recording medium I/F 503, such as a drive, which is able to mount one or more recording media. The recording medium I/F 503 is connected to the PC body 502 via, for example, a universal serial bus (USB).

The user sets a recording medium in the recording medium I/F 503, and then copies the main material files recorded on the recording medium onto a HDD 504 in the PC body 502. Furthermore, the PC 502 downloads the edited low-bitrate AV data file via the network interface 501, and searches by a search unit 505 for a corresponding relationship between the low-bitrate AV data file and the main material files recorded on the HDD 504 by using the serial number of the recording medium and the CLIP-UMIDs. Thereby the editing apparatus 404 can automatically edit the main material files and the low-bitrate AV data file.

Figure 6:
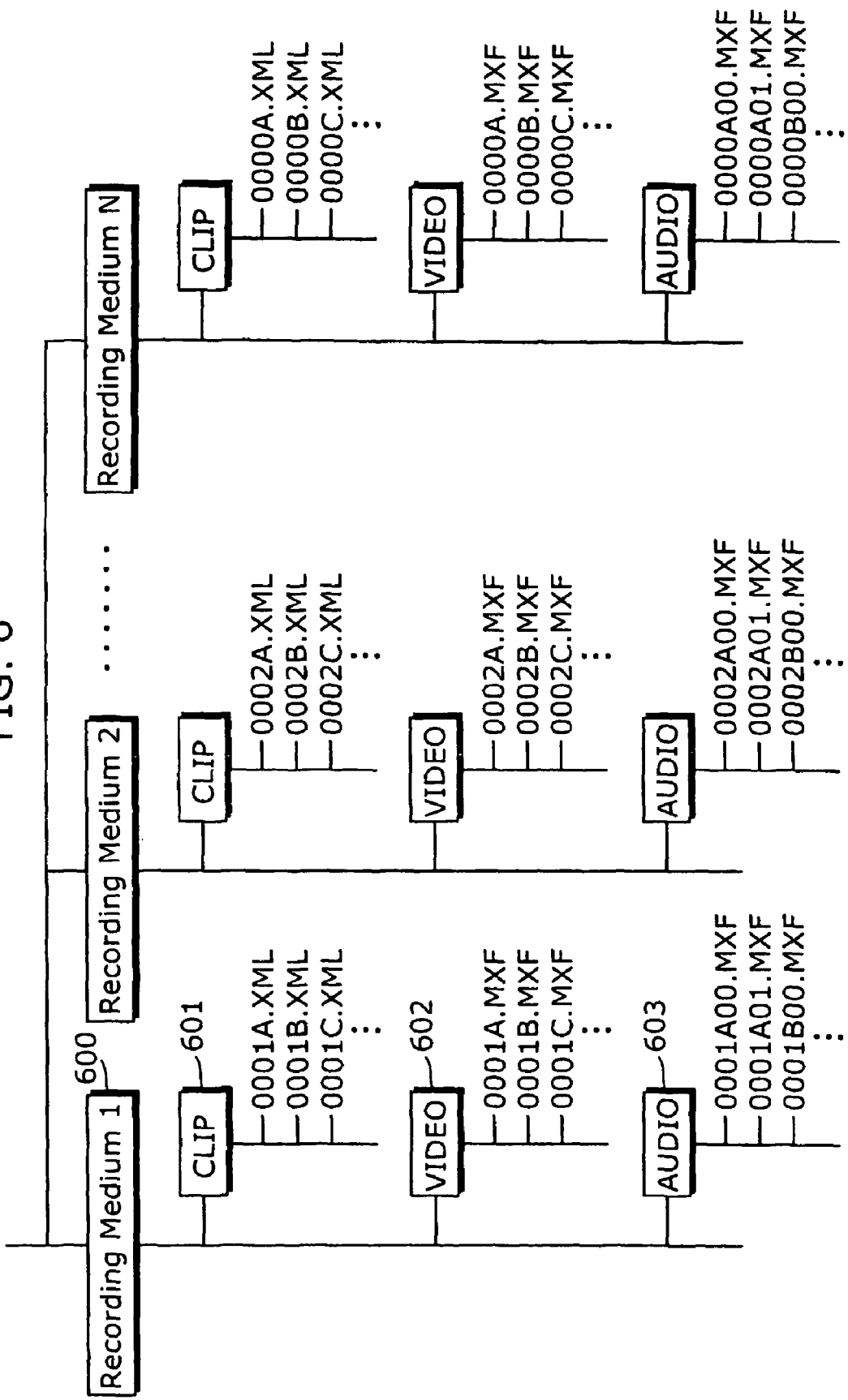
FIG. 6 is a reference diagram showing a case where N recording media are copied onto a hard disk drive (HDD) in the editing apparatus according to the embodiment of the present invention.

FIG. 6 is a reference diagram showing a case where N recording media are copied onto the HDD 504 in the editing apparatus 404 of FIG. 5. A file structure in a recording medium 600 as shown in FIG. 6 includes a clip metadata folder 601, a video data folder 602, and an audio data folder 603, and the like, so that data is stored in separate folders depending on types of the files.

When the recording medium is mounted and the files in the recording medium are copied, a serial number of the recording medium is read out to create a list indicating a corresponding relationship between the serial number and the folders in the recording medium.

Then, in order to search by the search unit 505 in the editing apparatus 404 for the main material files corresponding to the low-bitrate AV data file inputted from the network I/F 501, a recording medium serial number in the skip box is read to identify a recording medium (folder). Next, a CLIP-UMID is read out and clip metadata files in a folder of the identified recording medium are sequentially searched, thereby searching for the same CLIP-UMID. Thereby it is possible to perform the search processing efficiently.

As described above, in the digital video recording system according the embodiment, when the editing work is performed in a place which is different from the recording place during transporting the recording medium in which the main material files are recorded, it is possible to always properly maintain the corresponding relationship between the main material files and the edited result of the low-bitrate AV data file, by using the CLIP-UMID recorded in the skip box of the low-bitrate AV data file.

Furthermore, the low-bitrate AV data file and the main material file are automatically combined by using the serial number of the recording medium or the CLIP-UMID in order to generate final video data for broadcasting, so that it is possible to shorten a required time period from recording to broadcasting the material.

Note that, each recording medium may, for example, be mounted as one folder when the main material files are written onto the HDD, it is possible to efficiently search for the main material files and to relate the files with one another, by identifying the recording medium (folder) based on the serial number of the recording medium and then searching for main material files having the identical CLIP-UMID only in the files in the folder, when the main material files are searched and related with the low-bitrate AV data file or the like.

Note also that, in FIG. 4, the PC 403 for the editing work and the editing apparatus 404 for the final editing for broadcasting have been described to be different apparatuses, but those apparatus can be a single same apparatus. In such a case, the files except the main material files are transmitted from the recording site to the editing apparatus 404 at the broadcast station via a network, and the editing apparatus 404 firstly performs editing work during reproducing the low-bitrate AV data material, and then after receiving the main material files, replaces the low-bitrate AV data file with the main material files to finally edit the data for broadcasting. In this case, when the main material files corresponding to the specific low-bitrate AV data file are searched in a plurality of recording media in which main material files are filed, it is possible to perform the search processing speedily, by firstly identifying the recording medium using a serial number of the recording medium and then searching for the main material files in the identified recording medium.

Moreover, in FIG. 4, the recording medium 402 has been described to be transported directly to the broadcast station, but the main material files can be transmitted via a network. It takes considerable time to transmit the main material files, but if the low-bitrate AV data file has been transmitted prior to transmit the main material files, the editing work can be performed using the low-bitrate AV data file, so that it is also possible to perform the editing work efficiently.

Furthermore, the low-bitrate AV data file is not necessarily to be recorded on the same medium in which the main material files are recorded, but can be recoded directly on the HDD in the PC via a network during recording the material, or can be recorded on another medium only for the low-bitrate AV data file.

The embodiment has described that the clip has the structure of files, including the clip metadata file (XML format), the main material file of video data (MXF format), the main material file of audio data (MXF format), and the low-bitrate AV data file (MP4 format), but the file formats and the structure of files are not limited to the above, as far as the main material files and the low-bitrate AV data file which is generated with a bitrate lower than a bitrate of the main material are included. The present invention can be applied for other various formats, for example, the main material file is a high-bitrate MP4 file and has identification information unique to the file in the skip box, and the identification information is stored in the low-bitrate AV data file.

Although only the exemplary embodiment of the present invention has been described in detail above, those skilled in the art will readily appreciate that many modifications are possible in the exemplary embodiment without materially departing from the novel teachings and advantages of the present invention. Accordingly, all such modifications are intended to be included within the scope of the present invention.

INDUSTRIAL APPLICABILITY

The digital video recording system according to the present invention can properly maintain a corresponding relationship between the high-resolution first data and the low-resolution second data, even if the first data and the second data are generated as separate files to be recorded, sent, and managed, so that the digital video recording system is useful, for example, to record and edit video and audio data of a program material for broadcasting.

The invention claimed is:

1. A recording apparatus which records a first data with a high resolution and a second data with a resolution lower than the resolution of the first data as separate files, the first data and the second data being generated from a same video and audio source, said recording apparatus comprising:
- an input unit operable to receive the video and audio source from outside;
- a first coding unit operable to code the video and audio source inputted from said input unit in order to generate the first data;
- a second coding unit operable to code the video and audio source inputted from said input unit in order to generate the second data, the second data being coded with a resolution lower than a resolution of the first data; and
- a recording unit operable to record at least the first data generated by said first coding unit onto a recording medium,
- wherein the second data includes identification information unique to the first data,
- wherein the recording medium has a serial number which is unique to the recording medium, and
- wherein said recording unit is operable to store, into the second data, the serial number of the recording medium on which the first data is recorded.

2. The recording apparatus according to claim 1,
wherein a file format of the second data is a MPEG-4 format, and
the identification information is a Unique Material Identifier and stored in a skip box in the MPEG-4 format.

3. The recording apparatus according to claim 2,
wherein said recording unit is operable to store the serial number into the skip box in the second data.

4. An editing apparatus which edits a first data with a high resolution and a second data with a resolution lower than the resolution of the first data, the first data and the second data being recorded as separate files, and the first data and the second data being generated from a same video and audio source, said editing apparatus comprising
- a search unit operable to search for the first data by using identification information unique to the file of the first data, when the first data is searched, the identification information being included in the second data,
- wherein a recording medium in which the first data is stored has a serial number unique to the recording medium, and
- wherein said search unit is further operable to (i) identify the recording medium using the serial number of the recording medium on which the first data is stored and (ii) search for the first data in the identified recording medium using the identification information included in the second data, when the first data is searched.

5. The editing apparatus according to claim 4,
wherein a file format of the second data is a MPEG-4 format, and
the identification information is a Unique Material Identifier and stored in a skip box in the MPEG-4 format.

6. A digital video recording system comprising:
a recording apparatus which records a first data with a high resolution and a second data with a resolution lower than the resolution of the first data as separate files, the first data and the second data being generated from a same video and audio source; and
an editing apparatus which edits the first data and the second data,
wherein said recording apparatus includes:
- an input unit operable to receive the video and audio source from outside;
- a first coding unit operable to code the video and audio source inputted from said input unit in order to generate the first data;
- a second coding unit operable to code the video and audio source inputted from said input unit in order to generate the second data, the second data being coded with a resolution lower than a resolution of the first data; and
- a recording unit operable to record at least the first data generated by said first coding unit onto a recording medium, wherein said editing apparatus includes
- a search unit operable to search for the first data by using identification information unique to the file of the first data, when the first data is searched, the identification information being included in the second data,
- wherein the recording medium has a serial number which is unique to the recording medium,
- wherein said recording unit is operable to store, into the second data, the serial number of the recording medium on which the first data is recorded, and
- wherein said search unit is further operable to (i) identify the recording medium using the serial number of the recording medium on which the first data is recorded and (ii) search for the first data in the identified recording medium using the identification information included in the second data, when the first data is searched.

7. The digital video recording system according to claim 6,
wherein a file format of the second data is a MPEG-4 format, and
the identification information is a Unique Material Identifier and stored into a skip box in the MPEG-4 format.

* * * * *